April 9, 1968 D. W. VAN WINKLE 3,376,942
LARGE HOLE VERTICAL DRILLING APPARATUS
Filed July 13, 1965 9 Sheets-Sheet 1

INVENTOR.
DENZAL W. VAN WINKLE
By Bernard Kriegel
ATTORNEY.

April 9, 1968 D. W. VAN WINKLE 3,376,942
LARGE HOLE VERTICAL DRILLING APPARATUS
Filed July 13, 1965 9 Sheets-Sheet 3

INVENTOR.
DENZAL W. VAN WINKLE
BY Bernard Kriegel
ATTORNEY.

INVENTOR.
DENZAL W. VAN WINKLE
By Bernard Kriegel
ATTORNEY.

FIG. 8.

INVENTOR.
DENZAL W. VAN WINKLE
By Bernard Kriegel
ATTORNEY

# United States Patent Office 3,376,942
Patented Apr. 9, 1968

3,376,942
LARGE HOLE VERTICAL DRILLING APPARATUS
Denzal W. Van Winkle, La Mirada, Calif., assignor to Baker Oil Tools, Inc., City of Commerce, Calif., a corporation of California
Filed July 13, 1965, Ser. No. 471,629
27 Claims. (Cl. 175—81)

ABSTRACT OF THE DISCLOSURE

Formation drilling apparatus having a prime mover and cutters rotated thereby movable as a unit in the hole being drilled by inlet and exhaust conduits through which fluid is circulated to remove the cuttings, parts of the apparatus being releasably anchored to the wall of the hole to enable the cutters to be forced against the end face of the hole by fluid pressure.

---

The present invention relates to earth drilling apparatus, and more particularly to apparatus for drilling bore holes of relatively large diameters.

Heretofore, generally vertical holes have been drilled by securing a drill bit apparatus to the lower end of a drill string extending to the top of the hole. The apparatus is rotated by rotating the drill string from the top of the hole while part or all of the weight of the drill string is imposed on the bit apparatus to force it against the bottom of the hole. As hole diameters increase, the drilling weight requirements of the bit apparatus against the formation also increases, as well as the torque to be transmitted to the bit apparatus, and the problem of removing cuttings and conveying them to the top of the well bore. The weight of the drill string to be imposed on the bit apparatus to effect cutter penetration into the formation becomes so large as to make it difficult and extremely costly to provide equipment at the top of the hole capable of handling the drilling apparatus in the bore hole. As a result, there has been a practical limit on the diameter and depth of hole that can be drilled using conventional methods, especially in hard formations.

In general, large diameter holes can be drilled independently of the weight of any tubular string associated with the drilling apparatus by connecting a prime mover mechanism and cutter devices to inlet and exhaust conduits, by means of which they are moved longitudinally in the hole, the conduits also serving for the circulation of fluid to and from the region of cutting in the hole to remove cuttings therefrom. The cutting region in the hole can be sealed off to confine the circulating fluid to the region of the cutting operation and sweep the cuttings into the exhaust conduit. Parts of the apparatus are releasably anchored to the wall of the hole adjacent to the cutting region to provide a reaction point for a fluid operated mechanism capable of forcing the cutters against the end face of the hole with the required drilling force. After a length of hole has been cut, the sealing and anchoring portions of the apparatus are releasable and moved toward the end face of the hole and the cutters, whereupon such sealing and anchoring portions are re-engaged with the hole for reapplication of the required drilling force and recommencement of the drilling operation.

An object of the present invention is to provide drilling apparatus capable of drilling large diameter holes, in which the cutters are urged against the bottom of the hole with the required force without the necessity for transmitting drilling weight through a drill string, or the like. In a more limited sense, the drilling force and speed of rotation of the drilling apparatus can be readily varied and controlled at the bottom of the hole.

Another object of the invention is to provide rotary drilling apparatus capable of drilling large diameter holes without the need for transmitting rotary motion, torque, or drilling weight through a drill string, the cuttings being removed effectively from the bottom of the hole and conveyed to the top thereof.

A further object of the invention is to provide apparatus for drilling a generally vertical hole, in which the cuttings are removed by circulating a fluid medium in the hole, the apparatus being capable of sealing off the drilling region adjacent to the bottom of the hole to avoid the necessity for the circulating fluid medium to pressurize the entire bore hole, thereby reducing considerably the quantity of the fluid medium required and its possible loss into the formation.

An additional object of the invention is to provide rotary drilling apparatus for drilling large diameter, predominantly vertical bore holes which is directionally controllable.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 6 is a cross-section taken along the line 6—6 on FIG. 4a;

The apparatus A illustrated in the drawings is adapted to drill a generally vertical hole B of a comparatively large diameter, which, for example, may be of the order 6, 10, 12, 16 or 30 feet. It simultaneously drills a pilot hole C of relatively small diameter through use of a rotary pilot bit D, the final and larger diameter hole being drilled through use of a large or main drilling bit structure E.

The drill bit apparatus A is moved in the well bore to and from the bottom thereof by a pair of pipes or casings F, H, one of which is a central intake pipe F through which compressed air or other circulating fluid can be pumped in a downward direction, the other pipe H serving to conduct the compressed air and cuttings from the drilling region back to the top of the well bore. These two pipes are secured together in parallel relation near the bottom of the hole by a connector plate 10 which may be welded, or otherwise secured, thereto. Above the connector plate, the intake and air discharge pipes extend slidably through the end wall 11 of an upper head 12 of a support frame 13 which carries a mechanism 14 for anchoring the support frame, and other portions of the apparatus described hereinbelow, to the wall of the enlarged well bore B, and also a mechanism 15 for sealing off the frame against the wall of the well bore to confine the air or other circulating fluid under pressure to the drilling region.

As specifically shown, the upper head 12 has an inflatable packing element 16, made of a suitable pliant, elastic material, such as rubber, secured to it by upper and lower clamp rings 17 which are attached to the upper head by screws 18, or the like. When fluid under pressure is pumped into the packing element 16, it is expanded outwardly into sealing engagement with the wall of the bore B. As a precautionary measure, a lower inflatable packing element 16a can be secured to a lower head 12a of the support frame 13 by means of upper and lower clamp rings 17 and screws 18. When fluid under pressure is pumped into this lower packing element 16a, it is expanded outwardly into sealing engagement with the wall of the well bore. The removal of fluid under pressure from the upper and lower packing elements 16, 16a enables them to retract inherently from the wall of the bore hole B.

The support frame 13 between the upper and lower heads 12, 12a is cylindrical and imperforate. If fluid under pressure below the lower packing 16a were to tend to leak thereby, it can move upwardly around the exterior of the support frame 13 no further than the upper packing element 16, which will then be sealed against the wall of the bore B. The end wall 11 of the upper head is also imperforate, leakage between the intake and discharge pipes F, H and this head 12 being prevented by suitable side seal rings 20 on the end wall 11 slidably and sealingly engaging the pipes.

The intermediate portion 21 of the support frame between the heads 12, 12a is generally cylindrical and carries a plurality of circumferentially spaced anchor cylinders 22 which may be suitably secured thereto by welding, each of these cylinders having a piston 23 slidably mounted therein and extending outwardly thereof. An anchor shoe or gripping member 24, which may have a relatively large area, is secured to the outer end of each piston or piston rod 23 and may have teeth 25 thereon for embedding in the wall of the enlarged bore B when fluid pressure enters the head end of the cylinder 22. The application of fluid pressure into the rod end of the cylinder will retract the piston 23 and its companion shoe 24 from the wall of the bore B.

The anchor shoes 24 and packing elements 16, 16a serve to anchor or secure the frame 13 against longitudinal movement in the bore B, and also serve to take the reaction drilling torque imposed upon both the pilot bit D and the large or main bit structure E. As described above, the packing elements 16, 16a have the further function of confining fluid pressure in the bore hole to the region below the support frame 13, the upper packing element 16 supplementing the sealing function of the lower packing element 16a.

A central anchor tube 27 is suitably secured to and extends downwardly from the lower head 12a of the support frame, being adapted for reception within the pilot hole C produced by the pilot bit D. The lower portion of this anchor tube can also be anchored to the wall of the pilot hole C by a lower anchor device 28 which includes an expander 29 suitably secured to the lower portion of the anchor tube and which has an outer expander surface 30 tapering in an upward and inward direction. This expander is adapted to coact with circumferentially spaced slips 31 having inner surfaces 32 companion to the tapered expander surface 30, and which also have external teeth 33 adapted to be urged against and into the wall of the pilot bore C. The expander 29 is prevented from moving downwardly of the anchor tube by a deflector housing 34 threadedly secured to the lower end of the anchor tube 27, which housing is a portion of a directional stabilizer 35 capable of deflecting the pilot drill bit D, if desired, laterally of the axis of the hole C. The slips 31 make a tongue and groove interconnection 36 with the expander and they are movable jointly with one another by virtue of their upper T-shaped heads 37 being slidable radially in T-shaped slots 38 in an annular cylinder 39 having a lower cylinder head 40 slidable along the periphery of the anchor tube 27, a cylinder skirt 41 being slidable along an annular piston 42 secured to the anchor tube 27. The upper end of the skirt 41 is threadedly secured to an upper head 43 slidable along the anchor tube above the piston 42. Leakage of fluid from the annular cylinder 39 below the piston 42 is prevented by a suitable seal ring 44 on the lower cylinder head slidably and sealingly engaging the periphery of the anchor tube 27, and by a piston ring 45 slidably and sealingly engaging the cylinder skirt 41. Leakage of fluid from the annular cylinder space above the piston 42 is prevented by the piston ring 45 and by an upper seal ring 46 mounted on the upper head 43 and slidably and sealingly engaging the periphery of the anchor tube 27. When fluid under pressure is directed into the annular cylinder space 47 below the piston 42, the cylinder 39 is moved in a downward direction to shift the slips 31 downwardly along the expander 29 and radially outwardly into anchoring engagement with the wall of the well bore C. The direction of fluid under pressure into the cylinder space 48 above the piston 42 will elevate the cylinder 39 along the tube 27 and elevate the slips 31 therewith, causing them to slide along the expander 29 to a retracted position because of the tongue and groove interconnection 36 therewith.

The directional stabilizer 35 includes the housing 34, which has a plurality of cylinder bores 50, 51 therein, which, as specifically disclosed, may be four in number spaced 90 degrees apart. A piston 52 or 53 is disposed in each radial cylinder 50 or 51 and bears against an outer race 54 of a radial ball bearing 55, such ball bearing including an inner race 56 snugly and slidably embracing the periphery of a tubular pilot drill bit shaft 57 extending upwardly into the anchor tube 27, with ball bearing elements 58 between the races 54, 56 so that the inner race 56 can rotate with the drill bit shaft 57 within the non-rotatable outer race. By appropriately directing fluid under pressure to the various cylinders 50, 51, the pistons 52, 53 can be shifted in their cylinders to shift the bearing structure 55 in various directions crosswise of the deflector housing 34, and correspondingly shift or deflect the drill bit shaft 57 with respect to the axis of the housing 34, thereby determining the direction in which the pilot drill bit D, secured to the lower end of the shaft 57, will drill the pilot hole C.

The pilot drill bit shaft 57 extends upwardly through the anchor tube 27, its upper end 60 being piloted within the lower end 61 of the intake pipe F, such lower end being slidable within the lower head 12a of the support frame 13. Leakage of fluid between the pilot shaft and intake pipe is prevented by a seal ring 62 on the latter sealing against the periphery of the shaft portion 60. The upper end 60 of the pilot drill bit shaft 57 is rotatable within the intake pipe F, the shaft 57 being carried by a mounting plate 63 disposed below the lower head 12a through the agency of thrust bearings 64 engaging the upper and lower sides of the mounting plate, the lower bearing resting upon a shaft flange 65 and the upper bearing engaging a downwardly facing shoulder 66 of the shaft. The mounting plate 63 itself is affixed to the connector plate 10 through the agency of a plurality of circumferentially spaced tie rods 67 secured to both the connector plate 10 and the mounting plate 63, such that the mounting plate and connector plate move as a unit, and together with the intake and discharge pipes F, H. The discharge pipe H extends downwardly through the support frame 13 and slidably through its lower head 12a, which is also true of the intake pipe F which is slidable downwardly through the lower head 12a and along the interior of the anchor tube 27.

A hollow drive shaft 68 surrounds the anchor tube 27, its lower end being secured to a drive head 69 to which the mounting frame 70 of the large cutter apparatus E is suitably secured, as by means of screws 71, or the like, extending through a head flange 72 and into the mounting frame. This mounting frame carries a suitable number of saddles or supports 73 on each of which roller cutter members 74 are mounted adapted to engage the bottom M of the enlarged bore B. These cutting elements 74 are so arranged and extend downwardly from the mounting frame 70 as to be assured that the cutters will operate collectively upon all regions of the bottom M of the enlarged well bore to reduce the formation to cuttings.

A thrust member 76 surrounds the bottom portion of the rotatable shaft 68, its upper end wall 77 engaging a main cutter roller thrust bearing 78, the lower race 79 of which bears against the drive head 69. This thrust member is secured to the air discharge pipe H, so as to move therewith, and it has a skirt or manifold 80 surrounding the head, this head having an annular chamber 81 communicating with the lower inlet end 82 of the air discharge pipe, the annular chamber being closed by the depending skirt 80 of the manifold which has seal rings 83 on opposite sides of the annular chamber to prevent leakage of fluid from the latter. The annular chamber has a plurality of circumferentially spaced longitudinal exhaust tubes 84 extending downwardly through the cutter mounting frame 70 to a location adjacent to the bottom M of the hole, and each of these exhaust tubes communicates at its upper end with the annular chamber. Accordingly, circulating fluid will pick up cuttings from the bottom of the hole and carry them upwardly through the exhaust tubes 84 into the annular chamber 81, which is always in communication with the air discharge pipe H as the drive head 69, its annular chamber 81 and the entire large cutter mechanism E rotate during the drilling operation.

Both the pilot bit shaft 57 and pilot bit D and the main cutter apparatus E are rotated by a power source disposed adjacent to the drilling region in the well bore. As disclosed, a pair of electric drive motors 86 are located below the lower head 12a, the motion of each of these rotatable drive motors being transmitted through a planetary gear reducer 87 and a second reduction gearing 88 in a gear case 88a to a pinion 89 which meshes with a gear 90 affixed to the hollow drive shaft 68 that rotates the drive head 69 and the main cutter assembly E. There is a power take-off from the reduction gearing 88 that effects rotation of a drive shaft 91 having a drive sprocket 92, the rotary motion and torque being transmitted from this drive sprocket through a chain 93 to a driven sprocket 94 secured to the upper portion of the pilot drill bit shaft 57. Thus, there is a simultaneous rotation of the main or large cutter assembly E and of the pilot bit D, although it is preferred that the pilot bit be rotated at a faster speed than the large or main cutter structure to be assured that the main axial thrust, described hereinbelow, against the bits is taken by the main cutter structure E, and not by the pilot bit D.

The electric motors, reduction gear case and chain and sprocket drive are all supported from the mounting plate 63 which is affixed to the connector plate 10 through the agency of the intervening tie rods 67. The hollow drive shaft 68 is supported from the gear case 88a through upper and lower radial bearings 95 disposed on opposite sides of the gear 90.

Figure 8:
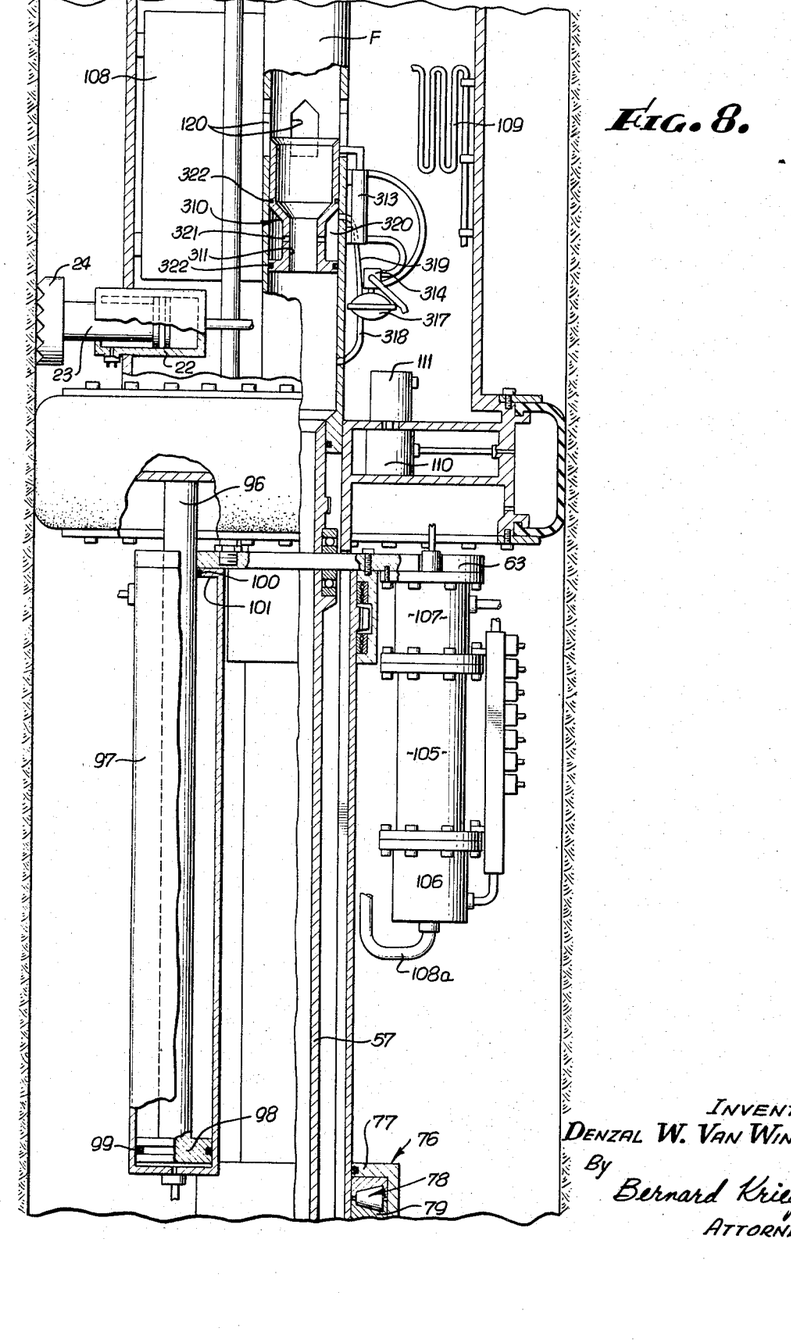
FIG. 8 is a vertical section taken along the line 8—8 on FIGS. 4a and 4b.
Figure 9:
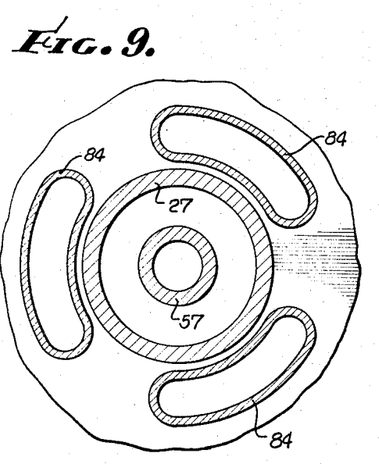
FIG. 9 is a section taken along the line 9—9 on FIG. 4b.
Figure 10:
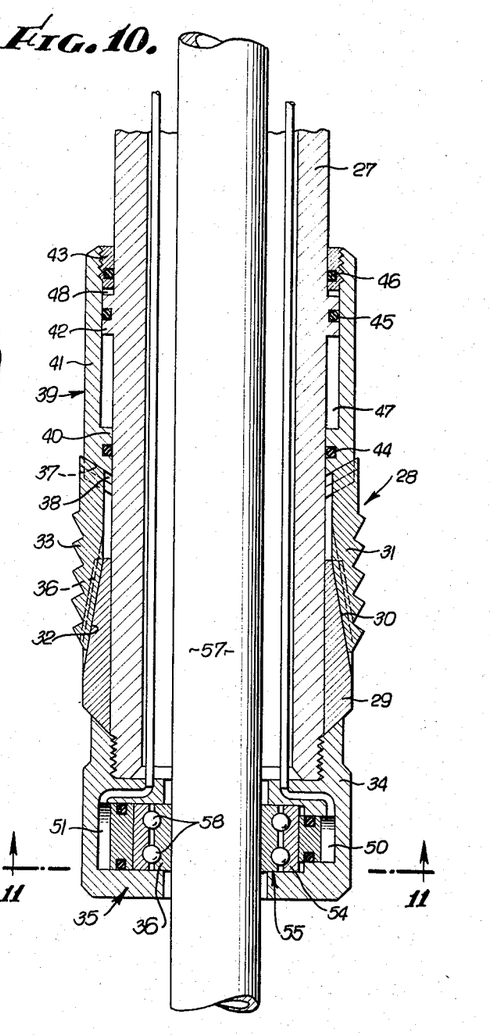
FIG. 10 is an enlarged longitudinal section through the lower anchor portion of the apparatus disclosed in FIG. 4c.
Figure 11:
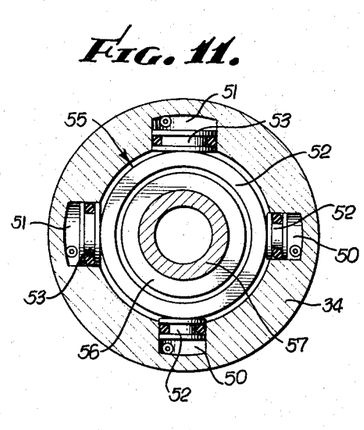
FIG. 11 is a cross-section taken along the line 11—11 on FIG. 10.

The drilling weight or thrust against the bottom P of the pilot hole C and of the bottom M of the enlarged hole B is provided hydraulically. As shown (FIG. 8), a plurality of circumferentially spaced vertical piston rods 96 have their upper ends suitably affixed to the lower head 12a, each of these rods extending through the mounting plate 63 and into a cylinder 97 suitably secured to the mounting plate, the lower end of the cylinder bearing upon the upper end of the thrust member 76. Each piston rod 96 has a piston 98 on its lower end slidable along the wall of its companion cylinder, there being a suitable piston ring 99 engaging the cylinder wall to prevent leakage therebetween. A suitable rod packing 100 is mounted on the upper cylinder head 101 for slidably sealingly engaging against the piston rod.

When fluid under pressure is introduced into the head ends of the cylinders 97, the cylinders are urged downwardly along the pistons 98, the thrust being transmitted downwardly against the main thrust member 76 and through the main cutter head thrust bearing 78 to the drive head 69 and the main cutter portion E of the apparatus, to force the several cutters 74 against the bottom M of the enlarged well bore. The downward thrust of the cylinders is also transmitted through the mounting plate 63 and the lower thrust bearing 64 to the pilot drill bit shaft 57 to force the drill bit D, which can be of any suitable type, such as the roller or roller cutter type, against the bottom P of the pilot hole. During rotation of the pilot bit shaft 57 and the hollow shaft 68 to rotate the pilot bit D and the large drill bit apparatus E, fluid pressure of the desired value can be introduced into the lower ends of the cylinders 97 to force them downwardly and impart the appropriate drilling force against the bottom P of the pilot hole C and the bottom M of the large diameter hole B. The entire cylinder structure, accompanied by the mounting plate and the entire drive mechanism, shifts downwardly of the lower frame head 12a and also downwardly along the anchor tube 27, there being a wide longitudinal slot 103 in the anchor tube through which the plate 63, drive chain 93, and other members can slide.

When it is desired to reelevate the drive mechanism and the thrust mechanism for the pilot bit and the large diameter bit, fluid under pressure is introduced into the cylinders 97 at their rod ends to elevate the cylinders and the members connected thereto upwardly along the piston rods 96 back to an upper position. As the drive mechanism moves downwardly in the well bore, following anchoring of the main support frame 13 and sealing of the packing elements 16, 16a against the wall of the enlarged well bore, the air intake and air discharge pipes F, H move downwardly with it as a unit. Such pipes also move upwardly with such mechanism as a unit.

The fluid or liquid under pressure for actuating the torque anchor devices 14, packages 16, 16a, the downweight or thrust cylinders 27, the pilot anchor mechanism 28, and the directional control or pilot bit deflector mechanism 35 is mounted upon the apparatus A itself. As shown, the mounting plate 63 carries an electric motor 105 which drives both a main pump 106 and a coolant ciruclating pump 107. The main pump draws liquid from a fluid reservoir 108 mounted within the support housing or frame 21 through a flexible suction line 108a and it can discharge the liquid under pressure through suitable lines to the mechanism to be operated thereby, as described hereinbelow. The coolant circulating pump 107 has the purpose of circulating a cooling liquid through all of the electric motors 86, 105 to dissipate the heat therefrom. Such liquid is pumped through a heat exchanger 109 carried by the frame 13, the liquid coolant then passing through the motors and back to the circulating pump intake. The heat exchanger 109 is preferably mounted within the support frame 13 in a region where air from the air intake pipe F will discharge thereagainst for the purpose of removing heat from the exchanger.

The main pump 106 also operates a hydraulic motor 110 that drives a centrifugal pump 111 for feeding fluid under pressure to the inflatable packing elements 16, 16a to expand the same against the wall of the well bore, as well as to withdraw liquid from such packing elements when they are to be retracted from the wall of the well bore B. Suitable valve assemblies and operating mechanisms therefor are also carried by the apparatus which can be remotely operated from the top of the well bore. For purposes of clarity, the control mechanism for the entire apparatus is illustrated diagrammatically in FIG. 12, described hereinbelow.

In the operation of the drill bit apparatus A, it may be assumed that part of the enlarged bore B has been drilled, as well as a pilot bore C. The apparatus is lowered in the well bore from the top thereof by means of the air intake and air discharge pipes F, H through suitable handling mechanism (not shown) until the pilot bit D is disposed in the pilot bore and engages the bottom P thereof and the large or main bit structure E engages the bottom M of the enlarged hole. During such lowering movement, the anchor shoes 24 and the packing elements 16, 16a are in retracted positions, and the entire drive mechanism 86–94 and drill bit weight or axial force producing mechanism 97 are in its relative upward position along the stationary piston rods 96 and anchor tube 27. The lower anchor 28 is also in a retracted condition. When drilling of the well bore is to continue, fluid under pressure is directed into the head ends of the anchor cylinders 22 to force the anchor shoes 24 outwarly against the wall of the bore B. Fluid under pressure is also directed into the annular cylinder 41 of the anchor device 28 to shift the slips 31 downwardly along the expander 29 and outwardly into anchoring engagement with the wall of the pilot hole C. Thus, the support frame 13 and the anchor tube 27 are anchored against longitudinal, and particularly upward, movement in the bores B, C, and support frame 13 and tube 27 also being prevented from moving angularly in the bore B and constituting stationary reaction devices for resisting the drilling torque.

The retracted packing elements 16, 16a are then inflated to effect their expansion against the wall of the enlarged well bore B and to seal off the drilling region therebelow. A circulating fluid, such as compressed air, is then pumped down the intake pipe F, this air passing into the tubular drill bit shaft 57 and discharging from the drill bit into the bottom of the pilot hole C. At the same time, air discharges from the intake pipe F through a plurality of outlet ports 120 into the support frame 13 and then down through the lower head 12a, which has large size openings therethrough, into the enlarged well bore below the lower packing element 16a. The air discharging from the pilot bit D can pass upwardly around the lower anchor device 28 and the anchor tube 27 into the well bore B at the location of the main cutter apparatus E. The compressed air in the enlarged bore B passes around the perimeter of the main cutter frame 70 and then sweeps inwardly across the bottom M of the enlarged bore into the exhaust tubes 84, accompanied by the air from the pilot hole C, passing into the annular chamber 81 of the drive head, from where it will pass through the air discharge pipe H to the top of the hole B.

The drive motors 86 are then energized to rotate the pilot shaft 57 and the main cutter apparatus E, after which fluid under pressure is directed into the head ends of the thrust cylinders 97 to apply the required drilling weight or force against the cutters of the pilot bit D and the main cutters 74. The compressed air discharging from the pilot bit D and into the enlarged bore B carries the cuttings with it to the exhaust tubes 84 for conveyance upwardly through the air discharge pipe H to the top of the bore B (FIGS. 1, 4a, 4b, 4c).

Figure 1:
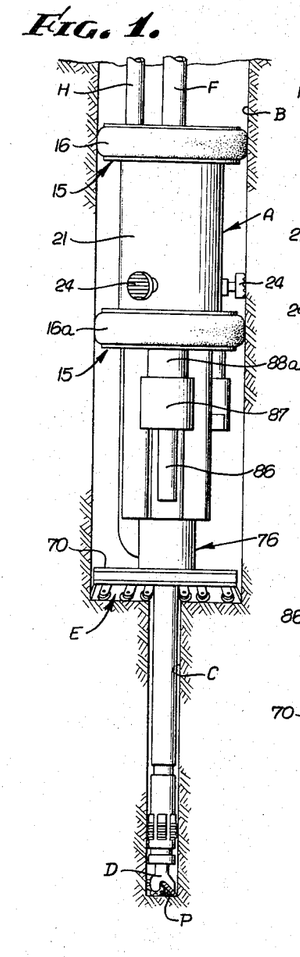
FIGURES 1, 2 and 3 are somewhat diagrammatic views of an apparatus disposed in a well bore, being drilled by it, in three different positions of operation.
Figure 2:
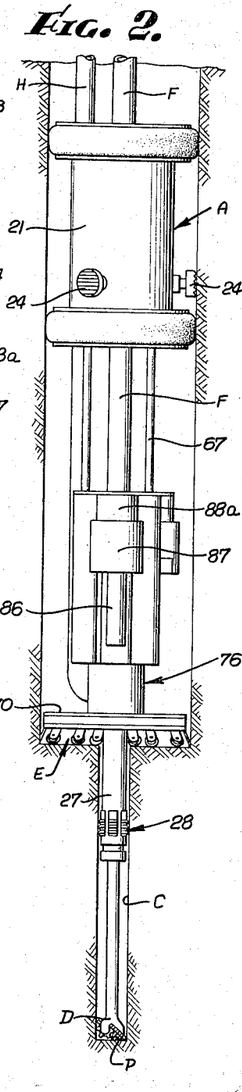
Figure 3:
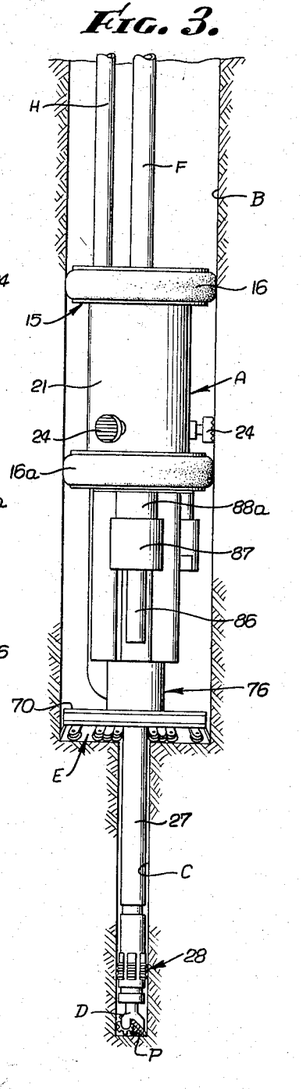
Figure 4A:
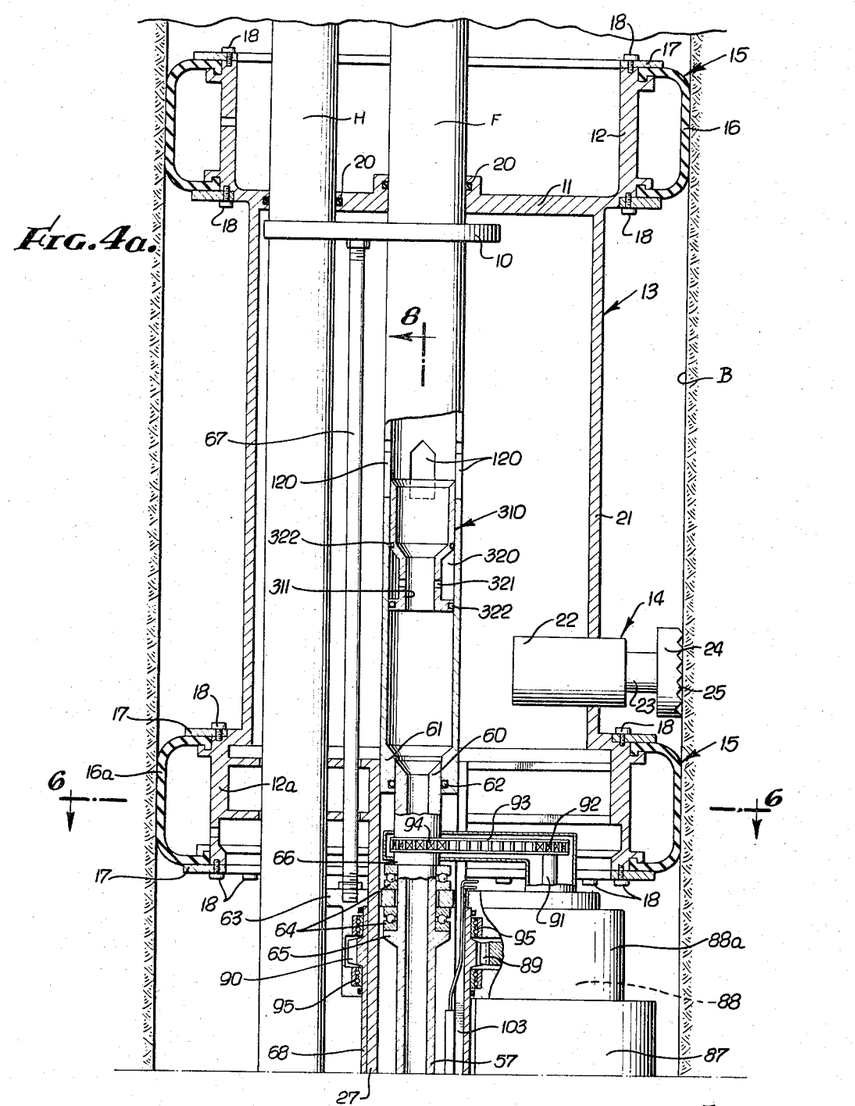
FIGS. 4a, 4b and 4c together constitute a longitudinal section, portions being shown in side elevation, through the apparatus illustrated in FIGS. 1 to 3, with its parts in one relative position, FIGS. 4b and 4c being lower continuations of FIGS. 4a and 4b, respectively.
Figure 4B:
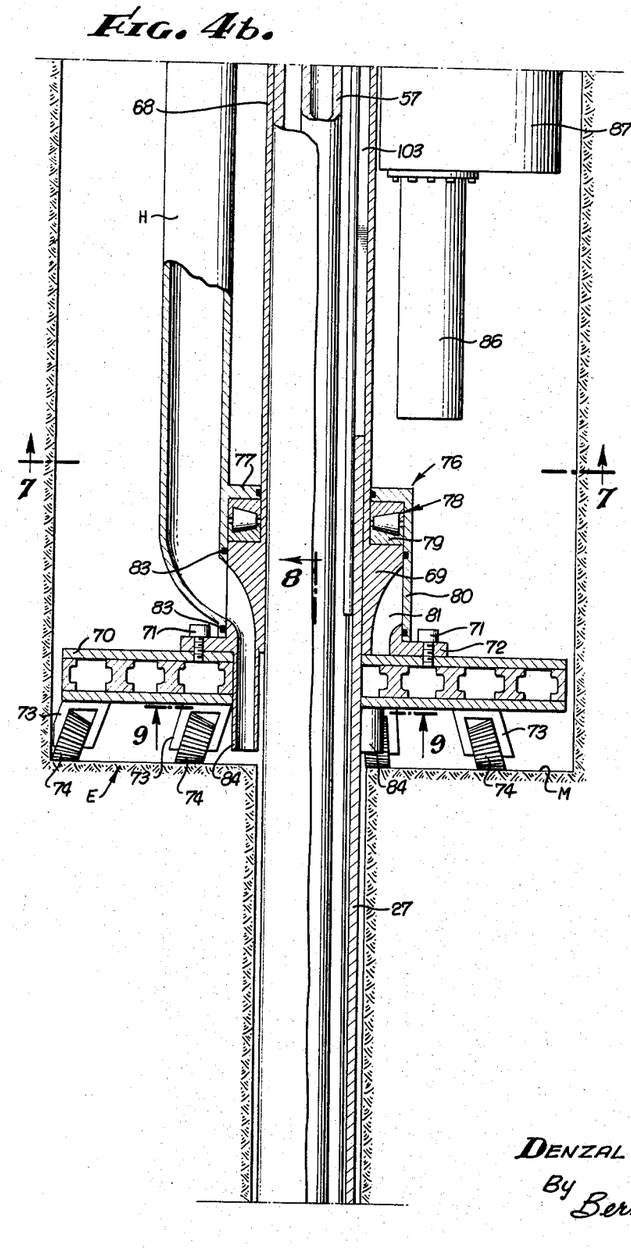
Figure 4C:
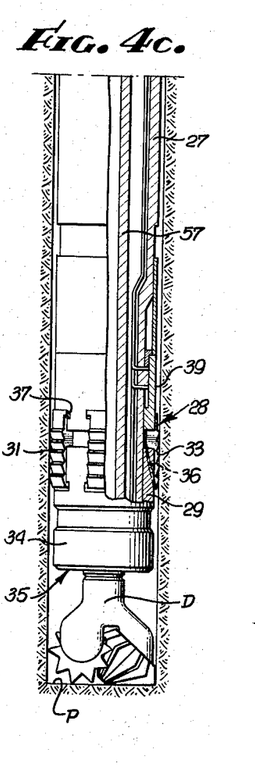
Figure 5A:
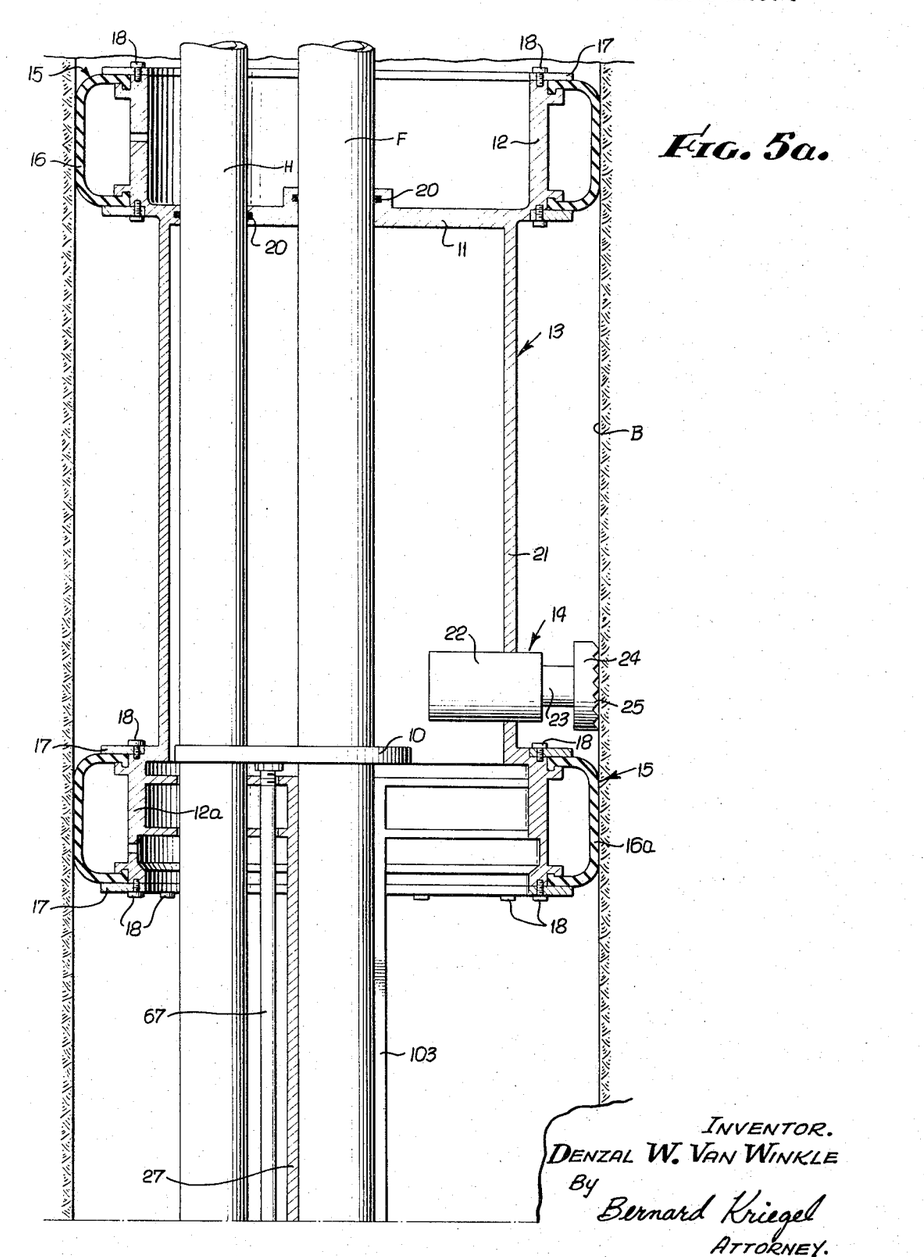
FIGS. 5a, 5b and 5c are views corresponding to FIGS. 4a, 4b and 4c, with the parts of the apparatus in another relative position, FIGS. 5b and 5c being lower continuations of FIGS. 5a and 5b, respectively.
Figures 5B, 5C:
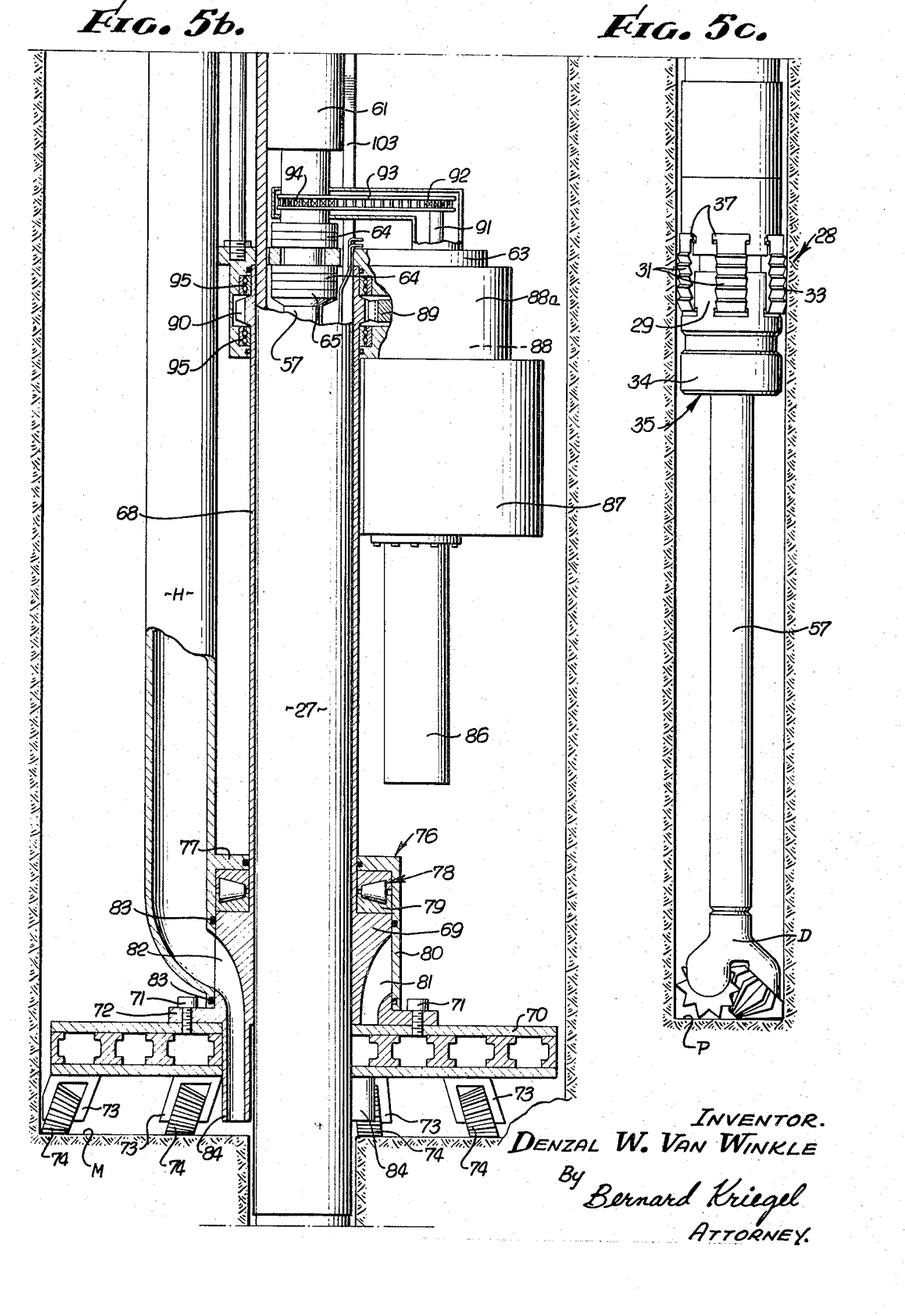
Figure 6:
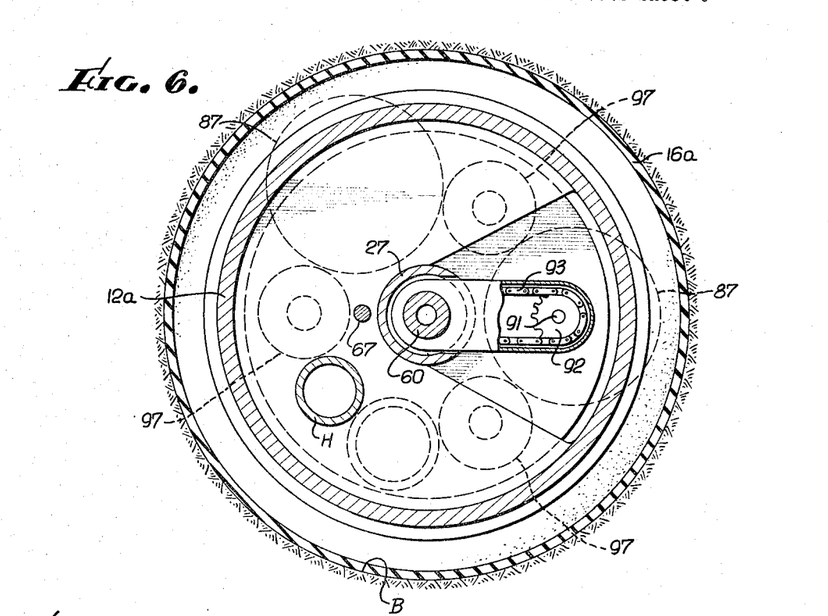
Figure 7:
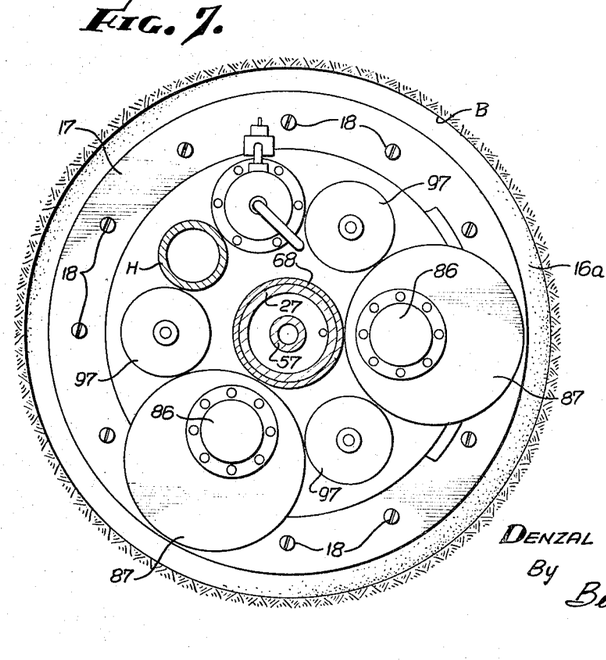
FIG. 7 is a cross-section taken along the line 7—7 on FIG. 4b.

As the hole B,C is being cut, the air intake and discharge pipes F, H, and all of the mechanisms connected thereto, including the drive mechanism and pump mechanism 105–107, supported by the mounting plate 63, shift downwardly with respect to the support frame 13 and with respect to the anchor tube 27 ( FIGS. 5a, 5b, 5c). Drilling can proceed until the end of the stroke of the cylinders 97 along the pistons 98 is reached (FIG. 2), after which the thrust load on the cylinders 97 is released by bleeding off the pressure in the head ends of the cylinders, and the rotation of the drilling apparatus is stopped, as well as the circulation of air downwardly through the intake pipe F. The packing elements 16, 16a are deflated and the anchor shoes 24 and the lower anchor device 28 released from the walls of the enlarged and pilot bores B, C. Fluid under pressure can then be introduced into the rod ends of the thrust cylinders 97 to shift the pistons 98 downwardly therewithin, which will carry the supporting frame 13 and its anchor and packing devices 14, 16, 16a downwardly in the bore B, and which will also advance the anchor tube 27 and the lower anchor device 28 in the pilot bore C until such parts have been advanced to their fullest extent, as disclosed in FIG. 3, the parts then again being in the relative position illustrated in FIGS. 4a, 4b and 4c. The above-noted sequence of operations can be repeated, beginning with the setting of the upper and lower anchors 14, 28, inflating of the packing elements 16, 16a, the commencing of air circulation, etc.

It it is necessary to change cutters, the thrust load in the cylinders 97 is released, rotation of the pilot and large bit devices D, E is stopped, circulation of the compressed air or other drilling fluid is stopped, the packing elements 16, 16a are deflated, and the anchors 14, 28 are released from the bores B, C. The apparatus A can then be elevated in th well bore to the top of the hole by elevating the air intake and discharge pipes F, H and also by reeling in electric cables, described hereinbelow, as each joint of pipe is pulled from the hole at the top thereof.

Figure 12:
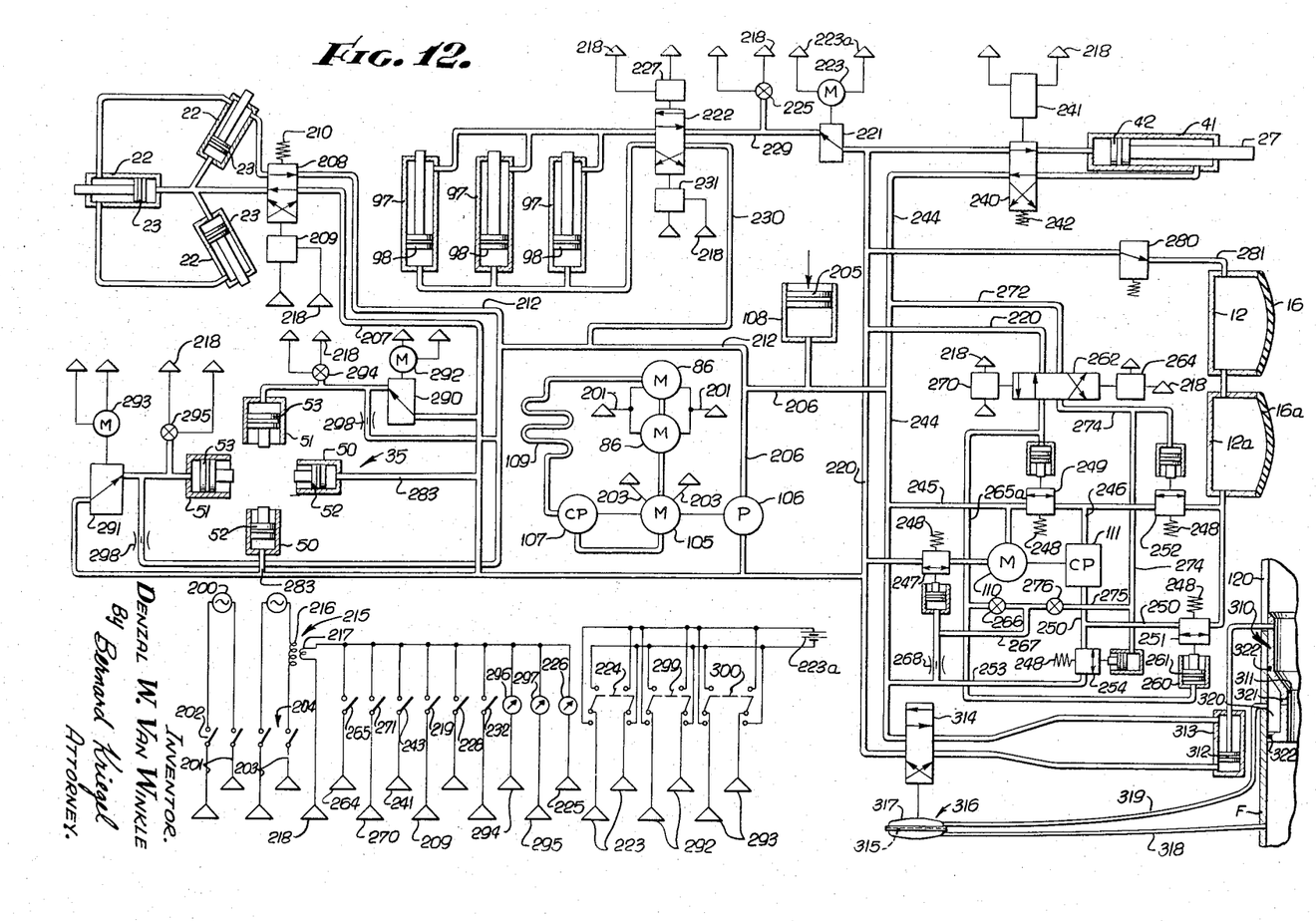
FIG. 12 is a diagrammatic view of the control system of the apparatus.

An operational system for the various mechanisms is disclosed diagrammatically in FIG. 12. The current to the electric cutter drive motors 86 is transmitted down the bore hole B from a source 200 through a suitable cable 201 connected to such motors and which is controlled by a suitable switch 202 at the top of th hole. Current to the electric motor 105 for driving the main and coolant pumps 106, 107 is also supplied through an electric cable 203 controlled by a switch 204 at the top of the hole and running to such motor. This electric motor 105, as was described above, rotates the coolant pump 107, which may be of the centrifugal type, which discharges the coolant fluid through the heat exchanger 109, the cooled liquid then passing sequentially through the electric drive motors 86 and the pump drive motor 105 back to the collant pump 107.

The liquid supply for the main pump 106 is drawn from the reservoir 108 carried by the main frame 13, which has a pressure diaphragm 205 therein to maintain the internal pressure of the liquid equal to the hydrostatic gradient. Liquid from the reservoir passes through a line 206 to the main pump 106, which is of the fixed pressure, variable volume type. Liquid under pressure from this pump can pass through a suitable line 207 to either the head ends or rod ends of the torque anchor jack cylinders 22 under the control of a two-position spool valve 208 operated by a solenoid 209. A spring 210 normally urges the spool valve into the position disclosed in FIG. 12, which will direct the pressure fluid into the head ends of the cylinders 22 to urge the pistons 23 outwardly and the anchor shoes 24 against the wall of the enlarged bore B. The rod ends of the cylinders 22 are then connected through a return line 212, 206 to the reservoir 108 and to the inlet line 206 to the main pump 106. When the solenoid 209 is energized, the spool valve 208 is shifted against the force of the spring 210 to a position in which the high pressure line 207 from the pump is connected to the rod ends of the cylinders 22 and the head ends of the cylinders are connected to the return line 212 to the pump 106 and reservoir 108, thereby effecting retraction of the anchor jacks 23 and of the shoes 24 from the wall of the enlarged bore.

Current for operating the solenoid 209 is derived from a suitable transformer 215 at the top of the hole, the primary winding 216 of which is connected in one of the lines 203 leading to the pump motor 105, the secondary winding 217 of the transformer running to a common connection 218 and through a switch 219 at the top of the well bore to the solenoid, this solenoid being connected to the common connecting point 218. Closing of the switch 219 will cause current to flow through the solenoid 209 and reverse the position of the valve 208 by shifting it to its anchor jack retracting position against the force of the spring 210. Opening of the switch will cause the spring 210 to return the spool valve 208 to its initial position, as illustrated.

Liquid under pressure from the main pump 106 passes from its discharge line 207 through another branch 220 to the thrust cylinders 97 under the control of a variable orifice valve 221 and a three-position spool valve 222 which is spring centered. The variable orifice valve 221 is adjustable by a reversible motor 223 connected to a source of current 223a at the top of the well bore by means of a double pole, double throw switch 224 so as to determine the direction of rotation of the motor. This motor 223 will vary the effective passage area of the orifice valve 221 and thereby determine the pressure of the fluid entering the thrust cylinders 97. Such pressure is indicated at the top of the well bore by acting upon a pressure transducer 225 in the well bore connected to a pressure gauge 226 at the top of the hole, which is readily observable by the operator.

The fluid at the required pressure can pass through the three-position spool valve 222 when it is in an open position into either the head end of the cylinders 97, to exert the appropriate downweight or drilling thrust against the main and pilot cutters, or into the rod end of the cylinders 97, to elevate them with respect to the pistons 98 therewithin. Normally, the spool valve is spring centered and is in closed position so that there is no fluid capable of passing into either end of the cylinders 97. When a solenoid 227 connected to the spool valve 222 is energized, as by passing current from the transformer 215 thereto as the result of closing a switch 228 at the top of the well bore, the spool valve 222 is shifted upwardly, as shown in FIG. 12, so that the fluid under pressure then passes through a line 229 into the head ends of the cylinders 97, to cause them to impose a hydraulic downward force against the cutters, the rod ends of the cylinders 97 then being connected to a return line 230 running to the reservoir 108 and the main pump 106.

In the event the thrust cylinders 97 are to be elevated relative to the pistons 98, another solenoid 231 is energized, as by closing a switch 232 at the top of the bore B, to complete a circuit therethrough, which will shift the spool valve 222 to a downward position, as illustrated in FIG. 12, which will then connect the high pressure line 229 to the rod ends of the cylinders 97 and which will connect the head ends of the cylinders to the return line 230 leading to the reservoir and pump 106.

Thus, by appropriately operating the reversible motor 223, the operator at the top of the well bore can adjust the position of the variable orifice valve 221 to determine the pressure imparted to the cylinders 97 as observed on the pressure gauge 226, or other corresponding indicator at the top of the bore hole. By appropriate control of the circuits to the solenoids 227, 231, he can determine whether the liquid under pressure is at the head ends of the cylinders 97, or their rod ends.

Fluid pressure to the pilot anchor 28 from the main pump 106 is controlled by a two-position spool valve 240 operated in one direction by a solenoid 241 and in the opposite direction by a spring 242. When the solenoid 241 is energized, the spool valve is in the position illustrated in FIG. 12, in which pressure from the main pump can pass into the upper end of the cylinder 41, elevating it with respect to the expander 29 and shifting the slips 31 to a retracted position. The solenoid is connected to the transformer 215 under the control of a switch 243 at the top of the hole, and when the switch is closed, the solenoid and valve 240 are shifted to the position illustrated in FIG. 12. When the switch 243 is open, the solenoid and valve are shifted by the spring 242 to a position in which the high pressure line 220 is connected to the lower end of the cylinder 41 and the upper end of the cylinder is connected to a line 244 running back to the reservoir 108. When in such position, the cylinder 41 is shifted downwardly along the anchor tube 27 to shift the slips 31 downwardly along the expander 29 and outwardly into engagement with the wall of the pilot hole C.

The liquid for inflating the packing elements 16, 16a is drawn from the reservoir 108 through lines 206, 244, 245, 246 leading to the centrifugal pump 111, and such centrifugal pump is also used to draw liquid from the inflatable packers and return them to the reservoir when the packers are to be retracted. The centrifugal pump 111 is rotated by the hydraulic motor 110, which is connectable to the high pressure line 220 leading from the main pump 106, such fluid under pressure being required to pass through a piston operated valve 247 which is normally shifted and retained in a closed position by a spring 248. Liquid can be drawn by the centrifugal pump 111 from the reservoir 108 when a piston operated valve 249 is opened and such liquid from the pump can be directed through a line 250 to the inflatable packers when another piston operated valve 251 is in open condition. Thus, when the valves 249 and 251 are open and the valve 247 leading to the hydraulic pump drive motor 110 is open, the centrifugal pump 111 can force fluid into the inflatable packers 16, 16a and expand them against the wall of the enlarged bore B.

When these packers 16, 16a are to be deflated, to inherently retract from the wall of the bore B, the intake line 246 of the centrifugal pump is connected to the inflatable packers under the control of a piston operated valve 252 and the discharge line 250 from the centrifugal pump is connected to a return line 253 leading to the reservoir 108, under the control of a piston operated valve 254. All five of the valves 247, 249, 251, 252, 254 referred to are normally in a closed position under the influence of their respective springs 248, and when fluid under pressure is allowed to enter a cylinder or chamber 260 in which the piston portion 261 of a valve is located, such valve is shifted and held in an open position.

Whether fluid pressure can pass through any of the piston valves is dependent upon a three-position spool valve 262 which can control the passage of fluid pressure to either the valves 252 and 254 or the valves 249 and 251. As shown, the three-position spool valve 262 is spring centered and is normally in its closed position. If the packers 16, 16a are to be inflated, a solenoid 264 is energized by closing a switch 265 in the circuit leading from the transformer 215 for the purpose of shifting the spool valve 262 to the right, as seen in FIG. 12, which will connect the piston valves 249, 251 to the high pressure line 220 leading from the main pump 106, and which will connect the valves 252, 254 to the return line 244 going back to the reservoir 108. Accordingly, fluid pressure will shift the valves 249, 251 to open position against the force of their springs 248, the valve 249 connecting the centrifugal pump 111 to the reservoir 108 through the line 245, allowing it to draw fluid therefrom and discharge the fluid through the open valve 251 to the interconnected packing elements 16, 16a to inflate the same. The fluid pressure in the line 265a running between the valves 249, 251 can pass through a check valve 266 and a line 267 leading to the piston valve 247, shifting it to its open position, the pressure being maintained in the piston valve 247 and flowing through a fixed orifice 268 back to the return line 244 leading to the reservoir 108.

The orifice 268 will insure the maintenance of a required back pressure in the piston valve 247 to hold it in an open position, thereby allowing fluid under pressure from the main pump 106 to pass to the hydraulic motor 110 and cause it to rotate the centrifugal pump 111, the fluid discharging from the hydraulic motor into the return line 245 running to the reservoir 108.

If it is desired to deflate or retract the packing elements 16, 16a, a solenoid 270 connected to the three-position spool valve 262 is energized by closing a switch 271 at the top of the bore B controlling a circuit from the transformer 215 to the solenoid, shifting the spool valve to the left, as seen in FIG. 12, which will then connect the high pressure line 220 from the pump 106 to the lines 274 running to the piston valves 252, 254 and connecting the valves 249, 251 to a line 272 running back to the reservoir 108. Accordingly, the springs 248 will shift the valves 249, 251 to their closed positions and will open the valves 252, 254. The liquid from the interconnected inflatable packers 16, 16a can now pass through the inlet line 246 running to the centrifugal pump 111, flowing from the discharge line 250 leading from the pump to the line 253 running back to the reservoir 106. Fluid under pressure will also flow through a branch 275 that has a one-way check valve 276 therein into the line 267 running to the piston valve 247 for the purpose of opening and holding such valve in an open position, so that fluid under pressure is fed to the hydraulic motor 110 to cause it to rotate the centrifugal pump 111.

Assuming that the three-position spool valve 262 has been positioned so that the valves 249, 251 are open and the packing elements 16, 16a inflated, liquid can be trapped in such inflated packers by opening the circuits to both solenoids 264, 270 and allowing the springs 248 to shift the spool valve 262 to its closed position. The pressure of such fluid can be maintained by causing fluid pressure from the discharge line 220 of the main pump to pass through a pressure regulator 280 into a line 281 leading to the inflatable packers. This pressure regulator will reduce the fluid pressure supplied by the pump 106 considerably. As an example, if the discharged pressure from the main pump 106 is 1,500 p.s.i., the pressure regulator 280 may be set so that the fluid pressure discharging therefrom and leading to the inflatable packers 16, 16a is about 60 p.s.i., which is sufficient pressure to retain the packing elements firmly sealed against the wall of the bore B. When the three-position spool valve 262 is in its entirely closed position, the hydraulic motor 110 and the centrifugal pump 111 are at rest.

The pilot bit deflector 35 is also under the control of the operator at the top of the well bore. Two of the cylinders 50 and pistons 52 therein, spaced 90 degrees from each other, are of relatively small size and are constantly subject to the fluid pressure of the main pump 106 flowing through the lines 207, 283. The other two cylinders 51 and their pistons 53 are of larger area and are subject to a lesser pressure than the pressure in the small cylinder 50, since the fluid under pressure from the main pump 106 can only pass to each of the large cylinders 51 through a variable orifice valve 290 or 291, each of which is operated by a reversible electric motor 292 or 293. Fluid can pass from each orifice valve into its associated larger cylinder, the pressure indication from each cylinder being transmitted to the top of the hole from a pressure transducer 294 or 295 through transformer circuits including pressure gauges 296, 297 at the top of the well bore. Fluid under pressure in each larger cylinder 51 can flow through a fixed orifice 298 back to the reservoir 108. The effective area of each orifice valve 290, 291 is controlled by the reversible motor 292 or 293, the electric circuit of which runs from the motor to the current source 223a at the top of the well bore, under the control of a double pole, double throw switch 299 or 300.

If the pilot bit deflector 35 is to be maintained in a neutral or coaxial position relative to the axis of the pilot hole C, the reversible motors 292, 293 will be operated so that the variable orifice valves 290, 291 will deliver a lesser unit pressure to the larger cylinders 51 than is delivered to the small cylinders 50. If it is assumed that the large cylinders 51 and their pistons 53 have twice the area of the small cylinders 50 and pistons 52, then a balanced condition will exist when half the unit fluid pressure is allowed to pass to the large cylinders 51 than passes to the small cylinders 50.

In the event it is desired to deflect the drill shaft 57 and the pilot bit D, the pressure to one or both of the large cylinders 51 can be increased or decreased, so that the pistons 52, 53 shift in their cylinders and can collectively deflect the shaft in any direction within the full range of 360 degrees. Deflection of the pilot bit D will cause the pilot hole C being drilled to deviate from the direction previously drilled, and will effect a corresponding deviation of the main cutter apparatus E drilling the large bore hole B.

The circulating medium for cooling the equipment and for removing the cuttings from the bottom of the well bore and for conveying them upwardly through the discharge pipe H to the top of the hole B divides between the pilot bit D and the large bit E. It is desired to maintain a proper proportion between the volume of compressed air flowing downwardly through the pilot bit shaft 57 and discharging from the pilot bit D and flowing around the main cutter frame 70 toward the exhaust tubes 84. As shown in the drawings, a slide valve 310 is disposed in the intake pipe F and is adapted to occupy various positions partially closing the outlet ports 120. Part of the fluid pumped down through the intake pipe F will pass through a restricted bore 311 in the lower portion of the slide valve and then flow downwardly through the pilot drill bit shaft 57 for discharge from the pilot bit D. The remainder of the compressed air will pass outwardly through the outlet ports 120.

The slide valve 310 is controlled by a piston 312 (FIG. 12) connected thereto and which is slidable in a cylinder 313 suitably affixed to the intake pipe F. The head and rod end of the cylinder 313 can have fluid under pressure from the main pump 106 selectively directed thereto, the other end of the cylinder being connected to the return line 244 leading to the reservoir 108. A three-position spool valve 314 will determine the position of the piston 312 in its cylinder, and will, accordingly, determine the position of the slide valve 310 with respect to the outlet ports 120. This spool valve is connected to the diaphragm 315 of a pressure diaphragm device 316 enclosed within a housing 317, one side of the diaphragm device being connected through a suitable line 318 to the air intake pipe F below the slide valve 310, and another line 319 of the diaphragm device being connected into the air intake pipe at an annular area 320 surrounding the reduced diameter portion 311 of the slide valve, which annular area communicates with the reduced diameter bore of the slide valve through one or more ports 321. Seal rings 322 are disposed on the slide valve on opposite sides of the line 319 leading to the annular area.

If the flow of air through the pilot bit shaft 57 is restricted, as, for example, by plugging of the bit D, the reduced rate of flow will cause an increase in the pressure in the annular space 320 surrounding the slide valve 310, causing an increase in pressure in the housing 317 above the diaphragm 115 and shifting the spool valve 314 downwardly, as shown in FIG. 12, which will connect the high pressure line 220 from the main pump 106 to the head end of the cylinder 313 which will cause the piston 312 to shift the slide valve 310 upwardly to a position further closing the ports 120. This will result in a greater air pressure in the pilot bit shaft 57 and will effect its clearing. In the absence of a control for the sleeve valve 310, all of the compressed air would pass outwardly through the side ports 120 and none would pass into the pilot hole C, resulting in damage to the bit D and the equipment in the pilot hole. By virtue of the control mechanism illustrated, the restricting or shutting off of the air flow through the side ports 120 will give an indication to the operator at the top of the hole that the air circulation is improper and remedial steps can be taken by him. As stated above, the restriction of the air flow through the ports will increase the air pressure flowing through the pilot bit shaft 57 and will ordinarily result in its clearing.

As the air flow through the pilot bit shaft 57 increases, its flowing at a more rapid rate past the ports 321 will reduce the pressure in the annular space 320 around the slide valve 310, reducing the pressure on the upper side of the diaphragm 315, which will effect upward shifting of the spool valve 314, as disclosed in FIG. 12, for the purpose of connecting the high pressure line 220 from the pump 106 to the rod end of the piston 312, and the head end of the piston to the return line 244 leading to the reservoir 108, effecting a downward shifting of the piston 312 and a downward movement of the slide valve 310 to more fully open the side ports 120. Thus, as the pressure varies, the slide valve is variously positioned to maintain the proper ratio between the volume of air discharging through the side ports 120 and the volume of air passing through the slide valve 310 and through the pilot bit shaft 57 for discharge into the bottom of the pilot hole C.

From the foregoing description and drawings, it is apparent that a drill bit apparatus has been provided which is capable of drilling large diameter holes. The intake and discharge pipes F, H merely have the function of conveying the apparatus A into and out of the hole, conducting a circulating medium to the drilling region, and carrying the cuttings from the drilling region back up to the top of the hole B. These pipe members need not transmit any of the drilling torque, or, for that matter, any other reaction torque, resulting from the rotation of the drill bits D, E against the formation, since the drilling torque is transmitted from the prime movers forming part of the downhole apparatus itself, and the reaction torque is transmitted through the anchor shoes 24 and the lower anchor 28 directly to the walls of the bores B, C. Similarly, these anchor mechanims withstand the drilling weight imposed upon the cutters, which can be varied by varying the pressure of the liquid passing into the head ends of the thrust cylinders 97.

The speed of the electric cutter drive motors 86 can also be varied by varying the frequency of the current at the top of the well bore. As an example, the electric motors can be designed to operate through frequencies ranging from 10 to 60 cycles per second, which will correspondingly vary their speed of rotation and the speed of rotation of the pilot bit D and of the main bit assembly E. Thus, the speed of rotation of the drill bits and the drilling force imposed by the bits against the formation can be determined from the top of the well bore and regulated so as to achieve optimum drilling effectiveness of the apparatus in cutting the hole.

The fluid for cooling the apparatus and for removing the cuttings from the bottom of the well bore can be discharged into the hole at the required pressures. It is only necesary to maintain pressure in the well bore below the apparatus A. It is not necessary to pressure the fluid in the entire well bore extending to the top of the hole, because of the sealing action of the sealing elements 16, 16a against the wall of the well bore B. Because of the longitudinally spaced relation between the sealing elements 16, 16a, if a longitudinal fissure or fracture is encountered in the well bore, fluid may be able to leak past the lower sealing element 16a, for example, but the upper seal element 16 will probably be disposed above such fracture or fissure so as to confine the circulating fluid under pressure to the bottom of the hole, and below the upper sealing element.

In the event it is desired to change the direction of the hole being drilled, such action can take place under the control of the operator at the top of the well bore by suitably modifying the pressures entering one or both of the large diameter cylinders 51 to correspondingly deflect the tubular pilot bit shaft 57 and the pilot bit D connected thereto.

All operations of the apparatus are controlled from the top of the well bore. The apparatus enables large diameter holes to be drilled, which, for example, may range from 6 feet to 30 feet in diameter, with ample drilling torque available for rotating the large diameter drill bit E, as well as the pilot bit D, and with ample thrust being available for imposition upon the cutter members, insuring that such cutter members can drill comparatively hard formations, as well as the softer formations. As an example, assuming a 12 foot diameter hole is being drilled in a relatively hard formation, a thrust of one to two million pounds can be imposed by the cylinders 97 upon the main drill bit apparatus E.

I claim:

1. In equipment for drilling a hole in a formation: an intake conduit disposed in the hole and extending to the top of the hole; an exhaust conduit disposed in the hole and extending to the top thereof; drill bit apparatus adapted to drill the hole, said apparatus including cutter means and a prime mover for rotating said cutter means; means operatively connecting said drill bit apparatus to said conduits for longitudinal movement by and with said conduits in the hole; said intake conduit being adapted to discharge circulating fluid into the hole to remove cuttings therefrom and force said cuttings through said exhaust conduit to the top of the hole.

2. In equipment for drilling a hole in a formation: an intake conduit disposed in the hole and extending to the top of the hole; an exhaust conduit disposed in the hole and extending to the top thereof; drill bit apparatus adapted to drill the hole, said apparatus including cutter means and a prime mover for rotating said cutter means; means operatively connecting said drill bit apparatus to said conduits for longitudinal movement by and with said conduits in the hole; said exhaust conduit extending to a region adjacent to the bottom of the hole; said intake conduit being adapted to discharge circulating fluid into the hole to remove cuttings therefrom and force said cuttings through said exhaust conduit to the top of the hole.

3. In equipment for drilling a hole in a formation: an intake conduit disposed in the hole and extending lengthwise thereof; an exhaust conduit disposed in the hole and extending lengthwise thereof; drill bit apparatus adapted to drill the hole, said apparatus including cutter means and a prime mover for rotating said cutter means; means operatively connecting said drill bit apparatus to at least one of said conduits for longitudinal movement by and with said one of said conduits in the hole; said intake conduit being adapted to discharge circulating fluid into the hole to remove cuttings therefrom and force said cuttings through said exhaust conduit; means providing a seal against the wall of the hole to one side and in the vicinity of said drill bit apparatus to prevent circulating fluid and cuttings from passing into the hole region externally of said conduits and on the opposite side of said seal means; and means mounting said cutter means for rotation with respect to said seal means to permit rotation of said cutter means during sealing of said seal means against the wall of the hole.

4. In equipment for drilling a hole in a formation: an intake conduit disposed in the hole and extending to the top of the hole; an exhaust conduit disposed in the hole and extending to the top thereof; drill bit apparatus adapted to drill the hole, said apparatus including cutter means and a prime mover for rotating said cutter means; means operatively connecting said drill bit apparatus to said conduits for longitudinal movement therewith in the hole whereby said conduits move said apparatus in the hole between the top and bottom thereof; said exhaust conduit extending to a region adjacent to the bottom of the hole; said intake conduit being adapted to discharge circulating fluid into the hole to remove cuttings therefrom and force said cuttings through said exhaust conduit to the top of the hole; means providing a releasable seal against the wall of the hole above and in the vicinity of said drill bit apparatus to prevent circulating fluid and cuttings from passing into the hole above said seal means and externally of said conduits; and means mounting said cutter means for rotation with respect to said seal means to permit rotation of said cutter means during sealing of said seal means against the wall of the hole.

5. In equipment for drilling a hole in a formation: a frame; means for releasably anchoring said frame against the wall of the hole; intake and exhaust conduits disposed in the hole and slidable along said frame; rotatable cutter means movable longitudinally of said frame for drilling the hole; means for rotating said cutter means; means carried by said frame for forcing said cutter means against the end face of the formation during rotation of said cutter means; said exhaust conduit having an inlet substantially at the hole axis closely adjacent to said cutter means and the end face of the formation engaged by said cutter means; and said intake conduit being adapted to discharge circulating fluid into the hole to remove cuttings therefrom and force said cuttings into said exhaust conduit inlet.

6. In equipment for drilling a hole in a formation: a frame; means for releasably anchoring said frame against the wall of the hole; intake and exhaust conduits disposed in the hole and slidable along said frame; rotatable cutter means movable longitudinally of said frame for drilling the hole; means for rotating said cutter means; means carried by said frame for forcing said cutter means against the end face of the formation during rotation of said cutter means; said exhaust conduit having an inlet closely adjacent to said cutter means and the end face of the formation engaged by said cutter means; said intake conduit being adapted to discharge circulating fluid into the hole to remove cuttings therefrom and force said cuttings into said exhaust conduit inlet; expandable and retractable packing means for sealing said frame against the wall of the hole to prevent cutting and circulating fluid from passing into the hole externally of said conduits and on the side of said seal means opposite said cutter means; and means for expanding and effecting retraction of said packing means against and from the wall of the hole.

7. In equipment for drilling a hole in a formation: a frame; means for releasably anchoring said frame against the wall of the hole; intake and exhaust conduits disposed in the hole and slidable along said frame; rotatable cutter means movable with said conduits longitudinally of said frame for drilling the hole; means movable longitudinally with said conduits and cutter means for rotating said cutter means; means carried by said frame for forcing said cutter means against the end face of the formation during rotation of said cutter means; said exhaust conduit having an inlet substantially at the hole axis closely adjacent to said cutter means and the end face of the formation engaged by said cutter means; and said intake conduit being adapted to discharge circulating fluid into the hole to remove cuttings therefrom and force said cuttings into said exhaust conduit inlet.

8. In equipment for drilling a hole in a formation: a frame; means for releasably anchoring said frame against the wall of the hole; intake and exhaust conduits disposed in the hole and slidable along said frame; rotatable cutter means movable longitudinally of said frame for drilling the hole; means for rotating said cutter means; a longitudinally extending fluid pressure cylinder means; a longitudinally extending fluid pressure piston means in said cylinder means; one of said fluid pressure means being secured to said frame, the other of said fluid pressure means being movable by fluid pressure in said cylinder means to force said cutter means against the end face of the formation during rotation of said cutter means; means for supplying fluid pressure to said cylinder means; said exhaust conduit having an inlet substantially at the hole axis closely adjacent to said cutter means and the end face of the formation engaged by said cutter means; and said intake conduit being adapted to discharge circulating fluid into the hole to remove cuttings therefrom and force said cuttings into said exhaust conduit inlet.

9. In equipment for drilling a hole in a formation: a frame; means for releasably anchoring said frame against the wall of the hole; intake and exhaust conduits disposed in the hole and slidable along said frame; rotatable cutter means movable longitudinally of said frame for drilling the hole; means for rotating said cutter means; a plurality of circumferentially spaced longitudinally extending fluid pressure cylinder means; a longitudinally extending fluid pressure piston means in each of said cylinder means; said cylinder means and piston means acting between said frame and cutter means to force said cutter means against the end face of the formation; means for supplying fluid pressure to said plurality of cylinder means; said exhaust conduit having an inlet adjacent to said cutter means; and said intake conduit being adapted to discharge circulating fluid into the hole to remove cuttings therefrom and force said cuttings into said exhaust conduit inlet.

10. In equipment for drilling a hole in a formation: a frame; means for releasably anchoring said frame against the wall of the hole comprising one or more cylinders and one or more pistons in said one or more cylinders, gripping means actuated by said one or more cylinders and pistons into engagement with the wall of the hole; intake and exhaust conduits disposed in the hole and slidable along said frame; rotatable cutter means movable with said conduits longitudinally of said frame for drilling the hole; means movable longitudinally with said conduits and cutter means for rotating said cutter means; a longitudinally extending fluid pressure cylinder means; a longitudinally extending fluid pressure piston means in said cylinder means; one of said fluid pressure means being secured to said frame, the other of said fluid pressure means being movable by fluid pressure in said cylinder means to force said cutter means against the end face of the formation during rotation of said cutter means; means for supplying fluid pressure to said cylinder means; said exhaust conduit having an inlet adjacent to said cutter means; said intake conduit being adapted to discharge circulating fluid into the hole to remove cuttings therefrom and force said cuttings into said exhaust conduit inlet; means separate from said anchoring means for sealing said frame against the wall of the hole to prevent cuttings and circulating fluid from passing into the hole externally of said conduits and on the side of said seal means opposite said cutter means; and means for placing said anchoring means and said sealing means in a condition simultaneously released from the wall of the hole to enable said frame, anchoring means and sealing means to be shifted as a unit toward the end face of the formation and toward said rotatable cutter means.

11. In equipment for drilling a hole in a formation: a support frame; means for releasably anchoring said frame against the wall of the hole; an exhaust conduit disposed in the hole and slidable along said frame; a cutter frame; cutter means mounted on said cutter frame for drilling the hole; means supporting said cutter frame for rotation and for movement longitudinally of said support frame; means for rotating said cutter frame and cutter means; means acting between said support frame and cutter frame for forcing said cutter means against the end face of the formation during rotation of said cutter frame and cutter means; said exhaust conduit having an inlet substantially at the hole axis closely adjacent to said cutter frame and the end face of the formation engaged by said cutter means; and means for conducting circulating fluid into the hole for passage around the perimeter of said cutter frame and lateral inward movement toward said inlet to force cuttings thereinto.

12. In equipment for drilling a hole in a formation: a support frame; means for releasably anchoring said frame against the wall of the hole; intake and exhaust conduits disposed in the hole and slidable along said frame; a cutter frame; cutter means mounted on said cutter frame for drilling the hole; means supporting said cutter frame for rotation and for movement longitudinally of said support frame; means for rotating said cutter frame and cutter means; means acting between said support frame and cutter frame for forcing said cutter means against the end face of the formation during rotation of said cutter frame and cutter means; said exhaust conduit having an inlet substantially at the hole axis closely adjacent to said cutter frame and the end face of the formation engaged by said cutter means; and said intake conduit being adapted to discharge circulating fluid into the hole for passage around the perimeter of said cutter frame and lateral inward movement toward said inlet to force said cuttings thereinto.

13. In equipment for drilling a hole in a formation: a support frame; means for releasably anchoring said frame against the wall of the hole; intake and exhaust conduits disposed in the hole and slidable along said frame; a cutter frame; cutter means mounted on said cutter frame for drilling the hole; means connecting said cutter frame for movement with said conduits longitudinally of said support frame; means movable longitudinally with said conduits and cutter frame for rotating said cutter frame and cutter means; means acting between said support frame and cutter frame for forcing said cutter means against the end face of the formation during rotation of said cutter frame and cutter means; said exhaust conduit having an inlet substantially at the hole axis closely adjacent to said cutter frame and the end face of the formation engaged by said cutter means; and said intake conduit being adapted to discharge circulating fluid into the hole for passage around the perimeter of said cutter frame and lateral inward movement toward said inlet to force cuttings thereinto.

14. In equipment for drilling a hole in a formation: a support frame; means for releasably anchoring said frame against the wall of the hole; intake and exhaust conduits disposed in the hole and slidable along said frame; a cutter frame; cutter means mounted on said cutter frame for drilling the hole; means connecting said cutter frame for movement with said conduits longitudinally of said support frame; means movable longitudinally with said conduits and cutter frame for rotating said cutter frame and cutter means; a longitudinally extending fluid pressure cylinder means; a longitudinally extending fluid pressure piston means in said cylinder means; one of said fluid pressure means being secured to said support frame, the other of said fluid pressure means being movable by fluid pressure in said cylinder means to force said cutter frame away from said support frame and said cutter means against the end face of the formation during rotation of said cutter frame and cutter means; means for supplying fluid pressure to said cylinder means; said exhaust conduit having an inlet adjacent to said cutter frame; said intake conduit being adapted to discharge circulating fluid into the hole for passage around the perimeter of said cutter frame and lateral inward movement toward said inlet to force cuttings thereinto; expandable and retractable packing means for sealing said support frame against the wall of the hole to prevent cuttings and circulating fluid from passing into the hole externally of said conduits and on the side of said seal means opposite said cutter frame; and means for expanding and effecting retraction of said packing means against and from the wall of the hole.

15. In equipment for drilling a hole in a formation: a frame; means for releasably anchoring said frame against the wall of the hole; cutter means movable longitudinally of said frame for drilling the hole; means for rotating said cutter means; means carried by said frame for forcing said cutter means against the end face of the formation during rotation of said cutter means; and means acting between said anchored frame and said rotating means for deflecting said cutter means laterally of the hole axis.

16. In equipment for drilling a hole in a formation: a frame; means for releasably anchoring said frame against the wall of the hole; cutter means movable longitudinally of said frame for drilling the hole; means for rotating said cutter means; means carried by said frame for forcing said cutter means against the end face of the formation during rotation of said cutter means; means acting between said anchored frame and said rotating means for deflecting said cutter means laterally of the hole axis; said deflecting means comprising a plurality of circumferentially spaced generally radial cylinder means and piston means in said cylinder means; and means for controlling the flow of fluid under pressure to said cylinder means to determine the direction of lateral deflection of said cutter means.

17. In equipment for drilling a hole in a formation: a frame; means for releasably anchoring said frame against the wall of the hole; cutter means movable longitudinally of said frame for drilling the hole; means for rotating said cutter means; means carried by said frame for forcing said cutter means against the end face of the formation during rotation of said cutter means; means acting between said anchored frame and said rotating means for deflecting said cutter means laterally of the hole axis; said deflecting means comprising a plurality of circumferentially spaced generally radial cylinder means and piston means in said cylinder means; means for feeding fluid under pressure to said cylinder means; and means controlled from the exterior of the hole for selectively varying the fluid pressure supplied to one or more of said cylinder means to determine the direction of lateral deflection of said cutter means.

18. In equipment for drilling a hole in a formation: a frame; means for releasably anchoring said frame against the wall of the hole; forward cutter means movable longitudinally of said frame for drilling a forward pilot hole in the formation; rearward cutter means for greater diameter than said forward cutter means and movable longitudinally of said frame for drilling a rearward hole of larger diameter than said pilot hole; said rearward cutter means being longitudinally spaced from said forward cutter means; means for simultaneously rotating said forward and rearward cutter means; and means for simultaneously forcing said forward and rearward cutter means axially of the hole against the formation to simultaneously drill said pilot hole and rearward hole while said forward and rearward cutter means are rotating.

19. In equipment for drilling a hole in a formation: a support frame; intake and exhaust conduits disposed in the hole and slidable along said frame; means for releasably anchoring said frame against the wall of the hole; rotatable forward cutter means movable longitudinally of said frame for drilling a forward pilot hole in the formation; rearward cutter means of greater diameter than said forward cutter means and movable longitudinally of said frame for drilling a rearward hole of larger diameter than said pilot hole; said rearward cutter means being longitudinally spaced from said forward cutter means; means for simultaneously rotating said forward and rearward cutter means; means carried by said frame for simultaneously forcing said forward and rearward cutter means axially of the hole against the formation to simultaneously drill said pilot hole and rearward hole while said forward and rearward cutter means are rotating; means for conducting circulating fluid from said intake conduit into said pilot hole adjacent to said forward cutter means and into said rearward hole to remove cuttings from said pilot and rearward holes and force such cuttings into said exhaust conduit.

20. In equipment for drilling a hole in a formation: a support frame; intake and exhaust conduits disposed in the hole and slidable along said frame; means for releasably anchoring said frame against the wall of the hole; rotatable forward cutter means movable longitudinally of said frame for drilling a forward pilot hole in the formation; rearward cutter means of greater diameter than said forward cutter means and movable longitudinally of said frame for drilling a rearward hole of larger diameter than said pilot hole; means for simultaneously rotating said forward and rearward cutter means; means carried by said frame for simultaneously forcing said forward and rearward cutter means axially of the hole against the formation to simultaneously drill said pilot hole and rearward hole while said forward and rearward cutter means are rotating; means for conducting circulating fluid from said intake conduit into said pilot hole adjacent to said forward cutter means and into said rearward hole to remove cuttings from said pilot and rearward holes and force such cuttings into said exhaust conduit; expandable and retractable packing means for releasably sealing said frame against the wall of the rearward hole to prevent cuttings and circulating fluid from passing into the rearward hole externally of said conduits and on the side of said seal means opposite said rearward cutter means; and means for expanding and effecting retraction of said packing means against and from the wall of the hole.

21. In equipment for drilling a hole in a formation: a support frame; intake and exhaust conduits disposed in the hole and slidable along said frame; means for releasably anchoring said frame against the wall of the hole; rotatable forward cutter means movable longitudinally of said frame for drilling a forward pilot hole in the formation; rearward cutter means of greater diameter than said forward cutter means and movable longitudinally of said frame for drilling a rearward hole of larger diameter than said pilot hole; said rearward cutter means being longitudinally spaced from said forward cutter means; means for rotating said forward and rearward cutter means; means carried by said frame for forcing said forward and rearward cutter means axially of the hole against the formation to drill said pilot hole and rearward hole; means for conducting circulating fluid from said intake conduit into said pilot hole adjacent to said forward cutter means and into said rearward hole to remove cuttings from said pilot and rearward holes and force said cuttings into said exhaust conduit.

22. In equipment for drilling a hole in a formation: a support frame; intake and exhaust conduits disposed in the hole and slidable along said frame; means for releasably anchoring said frame against the wall of the hole; rotatable forward cutter means movable longitudinally of said frame for drilling a forward pilot hole in the formation; rearward cutter means of greater diameter than said forward cutter means and movable longitudinally of said frame for drilling a rearward hole of larger diameter than said pilot hole; means for simultaneously rotating said forward and rearward cutter means; means carried by said frame for simultaneously forcing said forward and rearward cutter means axially of the hole against the formation to simultaneously drill said pilot hole and rearward hole while said forward and rearward cutter means are rotating; means for conducting circulating fluid from said intake conduit into said pilot hole adjacent to said forward cutter means and into said rearward hole to remove cuttings from said pilot and rearward holes and force such cuttings into said exhaust conduit; and means for maintaining a predetermined ratio between the circulating fluid in said intake conduit conducted into the pilot hole and conducted into the rearward hole.

23. In equipment for drilling a hole in a formation: a frame; means for releasably anchoring said frame against the wall of the hole comprising one or more cylinders and one or more pistons in said one or more cylinders, gripping means actuated by said one or more cylinders and pistons into engagement with the wall of the hole; intake and exhaust conduits disposed in the hole and slidable along said frame; rotatable cutter means movable longitudinally of said frame for drilling the hole; means for rotating said cutter means; means carried by said frame for forcing said cutter means against the end face of the formation during rotation of said cutter means; said exhaust conduit having an inlet adjacent to said cutter means; said intake conduit being adapted to discharge circulating fluid into the hole to remove cuttings therefrom and force said cuttings into said exhaust conduit inlet; normally retracted inflatable seal means on said frame, said seal means being separate from said anchoring means; means for forcing a fluid into said seal means to expand and seal the same against the wall of the hole to prevent cuttings and circulating fluid from passing into the hole externally of said conduits and on the side of said seal means opposite said cutter means; means for withdrawing fluid from said seal means to enable said seal means to retract from the wall of the hole; and means for placing said anchoring means in a condition released from the wall of the hole at the same time said seal means is retracted from the wall of the hole to enable said frame, anchoring means and seal means to be shifted as a unit toward the end face of the formation and toward said rotatable cutter means.

24. In equipment for drilling a hole in a formation: a frame; means for releasably anchoring said frame against the wall of the hole comprising one or more cylinders and one or more pistons in said one or more cylinders, gripping means actuated by said one or more cylinders and pistons into engagement with the wall of the hole; intake and exhaust conduits disposed into the hole and slidable along said frame; rotatable cutter means movable longitudinally of said frame for drilling the hole; means for rotating said cutter means; means carried by said frame for forcing said cutter means against the end face of the formation during rotation of said cutter means; said exhaust conduit having an inlet adjacent to said cutter means; said intake conduit being adapted to discharge circulating fluid into the hole to remove cuttings therefrom and force said cuttings into said exhaust conduit inlet; longitudinally spaced normally retracted seal means on said frame, said spaced seal means being separate from said anchoring means; means for expanding said spaced seal means against the wall of the hole to prevent cuttings from passing around said spaced seal means into the hole externally of said conduits and on the side of said spaced seal means opposite said cutter means; and means for placing said anchoring means and said seal means in a condition simultaneously released from the wall of the hole to enable said frame, anchoring means and seal means to be shifted as a unit toward the end face of the formation and toward said rotatable cutter means.

25. In equipment for drilling a hole in a formation: a frame; means for releasably anchoring said frame against the wall of the hole comprising one or more cylinders and one or more pistons in said one or more cylinders, gripping means actuated by said one or more cylinders and pistons into engagement with the wall of the hole; intake and exhaust conduits disposed in the hole and slidable along said frame; rotatable cutter means movable longitudinally of said frame for drilling the hole; means for rotating said cutter means; means carried by said frame for forcing said cutter means against the end face of the formation during rotation of said cutter means; said exhaust conduit having an inlet adjacent to said cutter means; said intake conduit being adapted to discharge circulating fluid into the hole to remove cuttings therefrom and force said cuttings into said exhaust conduit inlet; normally retracted inflatable seal means on said frame, said seal means being separate from said anchoring means; means for forcing a fluid into said seal means to expand and seal the same against the wall of the hole to prevent cuttings and circulating fluid from passing into the hole externally of said conduits and on the side of said seal means opposite said cutter means; means for withdrawing fluid from said seal means to enable said seal means to retract from the wall of the hole; means for placing said anchoring means in a condition released from the wall of the hole at the same time said seal means is retracted from the wall of the hole to enable said frame, anchoring means and seal means to be shifted as a unit toward the end face of the formation and toward said rotatable cutter means; and means controllable from the exterior of the hole for determining the forcing of fluid into said seal means and withdrawal of fluid from said seal means.

26. In equipment for drilling a hole in a formation: a frame; means for releasably anchoring said frame against the wall of the hole; intake and exhaust conduits disposed in the hole and slidable along said frame; rotatable cutter means movable longitudinally of said frame for drilling the hole; means for rotating said cutter means; means carried by said frame for forcing said cutter means against the end face of the formation during rotation of said cutter means; said exhaust conduit having an inlet substantially at the hole axis adjacent to said cutter means and the end face of the formation engaged by said cutter means; said intake conduit being adapted to discharge circulating fluid into the hole to remove cuttings therefrom and force said cuttings laterally inwardly of the hole into said exhaust conduit inlet; and means controllable from the exterior of the hole for varying the force applied by said forcing means upon said cutter means.

27. In equipment for drilling a hole in a formation: a frame; means for releasably anchoring said frame against the wall of the hole; intake and exhaust conduits disposed in the hole and slidable along said frame; rotatable cutter means movable longitudinally of said frame for drilling the hole; means for rotating said cutter means; a longitudinally extending fluid pressure cylinder means; a longitudinally extending fluid pressure piston means in said cylinder means; one of said fluid pressure means being secured to said frame, the other of said fluid pressure means being movable by fluid pressure in said cylinder means to force said cutter means against the end face of the formation during rotation of said cutter means; means for supplying fluid pressure to said cylinder means; said exhaust conduit having an inlet substantially at the hole axis adjacent to said cutter means and the end face of the formation engaged by said cutter means; said intake conduit being adapted to discharge circulating fluid into the hole to remove cuttings therefrom and force said cuttings laterally inwardly of the hole into said exhaust conduit inlet; and means controllable from the exterior of the hole for determining the supply of fluid pressure to said cylinder means.

References Cited

UNITED STATES PATENTS

| | | | |
|---|---|---|---|
| 2,663,545 | 12/1953 | Grable | 175—215 X |
| 2,891,769 | 6/1959 | Page et al. | 175—76 |
| 2,964,578 | 7/1960 | De Smaele | 175—76 X |
| 3,141,512 | 7/1964 | Gaskell et al. | 175—61 X |
| 3,185,225 | 5/1965 | Ginies | 175—94 |
| 3,195,835 | 7/1965 | Jackson et al. | 175—215 X |
| 3,283,835 | 11/1966 | Kellner | 175—215 X |
| 3,298,449 | 1/1967 | Bachman et al. | 175—230 X |

CHARLES E. O'CONNELL, *Primary Examiner.*

DAVID H. BROWN, *Examiner.*